(12) United States Patent
Grupe

(10) Patent No.: US 7,644,352 B2
(45) Date of Patent: Jan. 5, 2010

(54) CONTENT SCANNING OF COPIED DATA

(75) Inventor: Robert Grupe, Tring (GB)

(73) Assignee: McAfee, Inc., Santa Clara, CA (US)

( * ) Notice: Subject to any disclaimer, the term of this patent is extended or adjusted under 35 U.S.C. 154(b) by 813 days.

(21) Appl. No.: 09/879,071

(22) Filed: Jun. 13, 2001

(65) Prior Publication Data
US 2002/0194212 A1 Dec. 19, 2002

(51) Int. Cl.
*G06N 3/00* (2006.01)
(52) U.S. Cl. .......................................... 715/234; 726/24
(58) Field of Classification Search ................. 345/443, 345/422, 424, 168; 715/500, 526, 513, 517, 715/523, 530, 234, 243, 254; 726/24
See application file for complete search history.

(56) References Cited

U.S. PATENT DOCUMENTS

| | | | | |
|---|---|---|---|---|
| 5,832,212 A | * | 11/1998 | Cragun et al. ............... | 713/202 |
| 5,850,559 A | * | 12/1998 | Angelo et al. ............... | 713/320 |
| 6,279,128 B1 | * | 8/2001 | Arnold et al. ................. | 714/49 |
| 6,460,055 B1 | * | 10/2002 | Midgley et al. ............. | 707/204 |
| 6,560,632 B1 | * | 5/2003 | Chess et al. ................. | 709/201 |
| 6,581,207 B1 | * | 6/2003 | Sumita et al. ................ | 725/46 |
| 6,717,943 B1 | * | 4/2004 | Schwering .................. | 370/389 |
| 6,728,964 B1 | * | 4/2004 | Butt ............................ | 719/313 |
| 6,802,012 B1 | * | 10/2004 | Smithson et al. ............. | 726/24 |
| 6,928,555 B1 | * | 8/2005 | Drew .......................... | 726/24 |
| 7,080,407 B1 | * | 7/2006 | Zhao et al. ................... | 726/24 |

* cited by examiner

*Primary Examiner*—Kyle R Stork
(74) *Attorney, Agent, or Firm*—Zilka-Kotab, PC

(57) ABSTRACT

An on-demand virus and banned files scan, which uses a scanning computer to scan a copy of data downloaded from a source computer. This scanning computer produces a log file identifying data having characteristics indicative of a virus or a banned file and sends this log file back to the source computer. The source computer then scans just the data identified by the log file, thereby accomplishing a complete scan in a reduced amount of time.

40 Claims, 5 Drawing Sheets

CONTENT SCANNING OF COPIED DATA

BACKGROUND OF THE INVENTION

1. Field of the Invention

This invention relates to the field of data processing systems. More particularly, this invention relates to data processing systems in which it is desired to scan a plurality of computer files to identify one or more predetermined characteristics indicative of a computer file having some specified content.

2. Description of the Prior Art

It is known to provide anti-virus computer programs and E-mail and data filtering programs. Anti-virus programs may operate in an on-access mode or an on-demand mode. The on-access mode initiates a scan of a file when an access request to that file is made. The on-demand mode initiates a scan of all files on a specified volume or volumes either on a user request or on a scheduled request.

An anti-virus scan of a file consists of scanning that file for computer viruses, worms, Trojans or other undesired content. This is done by comparing the file with a library of data that defines content to be detected.

In a similar manner, content filtering programs scan files and incoming or outgoing messages for undesired content. This may happen when the messages are flowing in or out, or alternatively, it may take place in an on-demand way. That is to say, a scan of a complete volume of data or messages is initiated by a user or as a scheduled event.

A problem found with on-demand scans is the ever increasing time needed to perform this scan. This is due to an increasing amount of data to be scanned along with a growing number of computer viruses and other undesired forms of content for which it is desired to scan. In general an on-demand scan is performed at slack times, such as during the night or at a weekend, to avoid overloading of the server. However, given the increasing time required for these scans, the situation can arise when these periods of time are not sufficient to allow an on-demand scan to be run. This can result in such scans being terminated early which decreases the security and usefulness of such systems.

SUMMARY OF THE INVENTION

Viewed from one aspect the present invention provides a computer program product comprising a computer program operable to control a scanning computer to produce a log file identifying computer data from a source computer having specified content, said computer program comprising: scanning logic operable to scan computer data transferred from said source computer to said scanning computer and to identify one or more portions of said computer data having one or more predetermined characteristics indicative of said computer data having said specified content; and log generating logic operable to write details of said identified portions to a log file.

The invention recognises the above problem of scans of computer data that take so long that a complete scan of the data cannot be performed during slack time, such as overnight or during the weekend. To address this problem embodiments of the invention transfer data to be scanned from a source computer to a scanning computer. The scanning computer then scans the data and creates a log file identifying portions of the data that have predetermined characteristics indicating a particular specified content. This enables the source computer to rescan or otherwise selectively process the data identified in the log file, which considerably reduces the processing time of the source computer needed for a scan.

Although the log file may be transferred back to the source computer by the use of tapes or disks, it is preferable that the computer program product comprises log transferring logic operable to control said scanning computer to transfer said log file, via a network connection to said source computer.

Although any content of data that the user cares to specify may be scanned for, embodiments of the invention are particularly well suited to scanning for one or more of: a computer virus; a worm; a Trojan; and a computer file comprising banned content. Alternatively, embodiments of the invention can be used as part of an e-mail or file storage filtering system, wherein the specified content includes banned words or phrases.

In some cases it is known that a particular content appears only in a certain type of file. In these cases, in order to increase the speed of the scan embodiments of the present invention can limit the scan to a particular type of file by the use of scanning logic operable to scan computer data located in, say, executable computer files only.

In preferred embodiments of the present invention said scanning computer is a backup computer for performing a backup procedure upon said computer data of said source computer, said computer program product being operable to control said backup computer to scan said computer data transferred to said backup computer from said source computer during said backup procedure. In a backup procedure a copy of data from the source computer to the backup computer is made as part of the backup procedure. Thus, data that has already been copied is scanned, and it is just the relatively small log file that needs to be transferred back to the source computer. This is a strongly synergistic combination.

In some embodiments substantially all data stored on said source computer can be scanned, in others, data stored on a single storage device of said source computer is scanned.

A further aspect of the present invention provides a computer program product comprising a computer program operable to control a source computer to scan computer data stored by said source computer to identify one or more portions of said computer data having one or more predetermined characteristics indicative of said computer data having some specified content, said computer program comprising: log reading logic operable to control said source computer to read a log file written by a scanning computer, said log file identifying portions of said computer data having said predetermined characteristics; and response logic responsive to said log file and operable to control said source computer to perform further processing tasks upon at least said data identified in said log file as having said predetermined characteristics.

In some embodiments of the invention said computer data comprises a fraction of data stored on said source computer, said computer program product being operable to control said source computer to transmit at least one further fraction of said data to at least one further scanning computer, and to control said source computer to receive a log file from each of said at least one further scanning computers. By dividing the data to be scanned into different fractions and sending each fraction to a different scanning computer, a scan can be performed in less time that it would take a single scanning computer. Thus, in a situation where it was not possible to do a complete scan during a slack period, such as overnight, on a single computer, it may be possible to perform such a scan on a plurality of computers.

In embodiments of the invention the computer program product comprises anti-virus logic operable to control said source computer to perform a virus response action upon data identified. Thus, in addition to detecting viruses, embodiments of the present invention may delete and/or disinfect any viruses that are found.

Further aspects of the present invention are set out in the appended claims.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
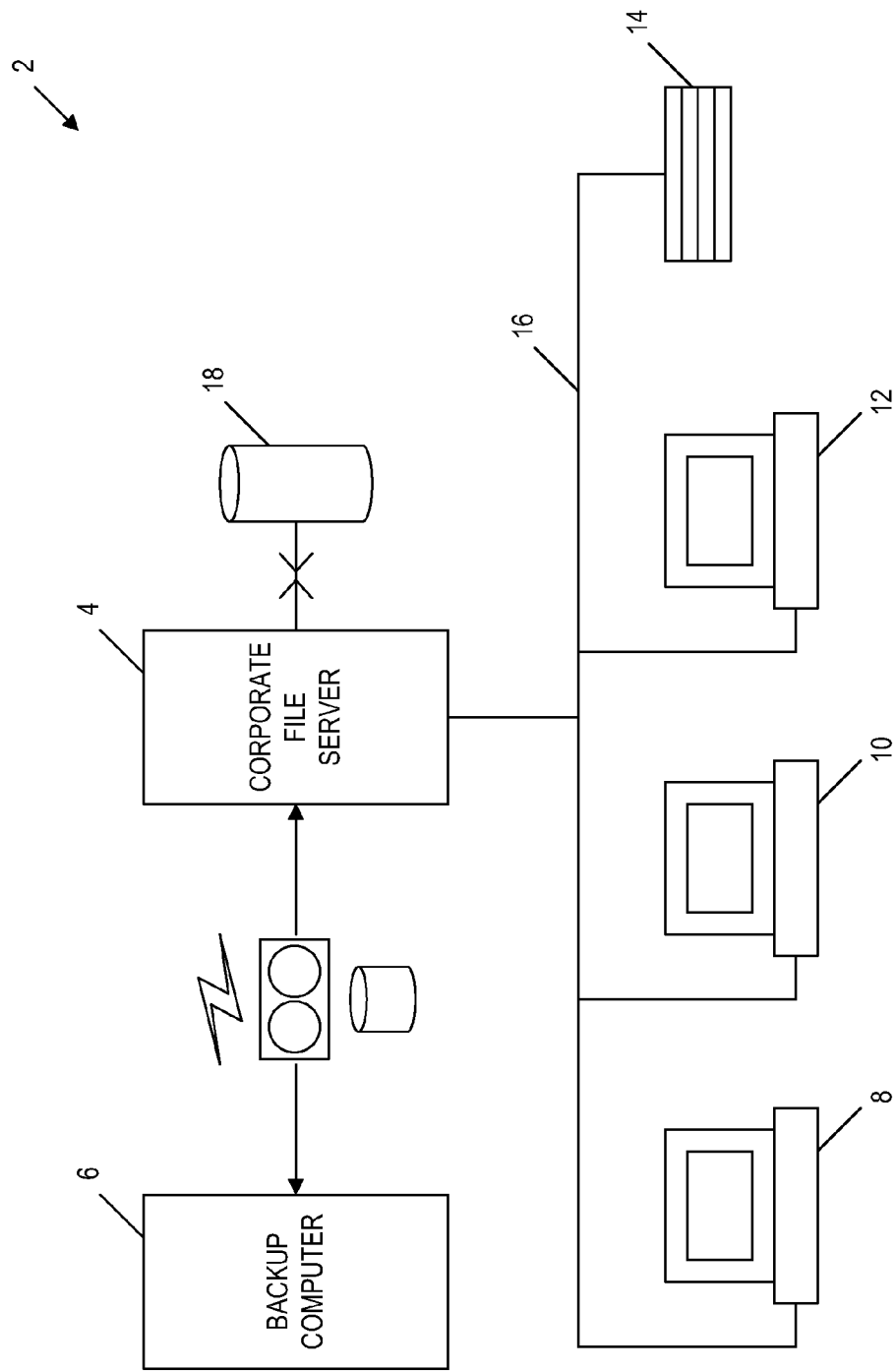
FIG. 1 schematically illustrates a computer network.

FIG. 1 illustrates a computer network 2 including a server 4, a plurality of client computers 8, 10, 12 and a plurality of rack mounted appliance computers 14. A local area network 16 connects these computers.

The server 4 includes a network storage device 18 providing file storage for the computers connected to the local area network 16. FIG. 1 also illustrates a backup computer 6 for providing a backup of the files on the server 4. Information can pass between the server 4 and the backup computer 6 via a local network, the Internet or with the use of disks or tapes.

In operation the network storage device 18 is subject to regular on-demand scans to identify computer viruses, Trojans, Worms and/or files with banned content. As the network storage device 18 can be very large, the amount of processing time required to compare every stored file against an increasing number of virus definition profiles can be extremely long. In general, the server 4 performs such scans during quiet times, such as the night or weekend. Given the increasing length of time required for such scans, it may well be that it is not possible to complete these scans during the quiet times. This could result in incomplete scans which carry the risk of viruses going undetected.

A further example, is that the device may comprise a mail server, which stores all the received and sent e-mails into and out of the network 2. These stored mail messages may be subject to on-demand filtering scans, wherein such things as banned words are searched for.

Figure 2:
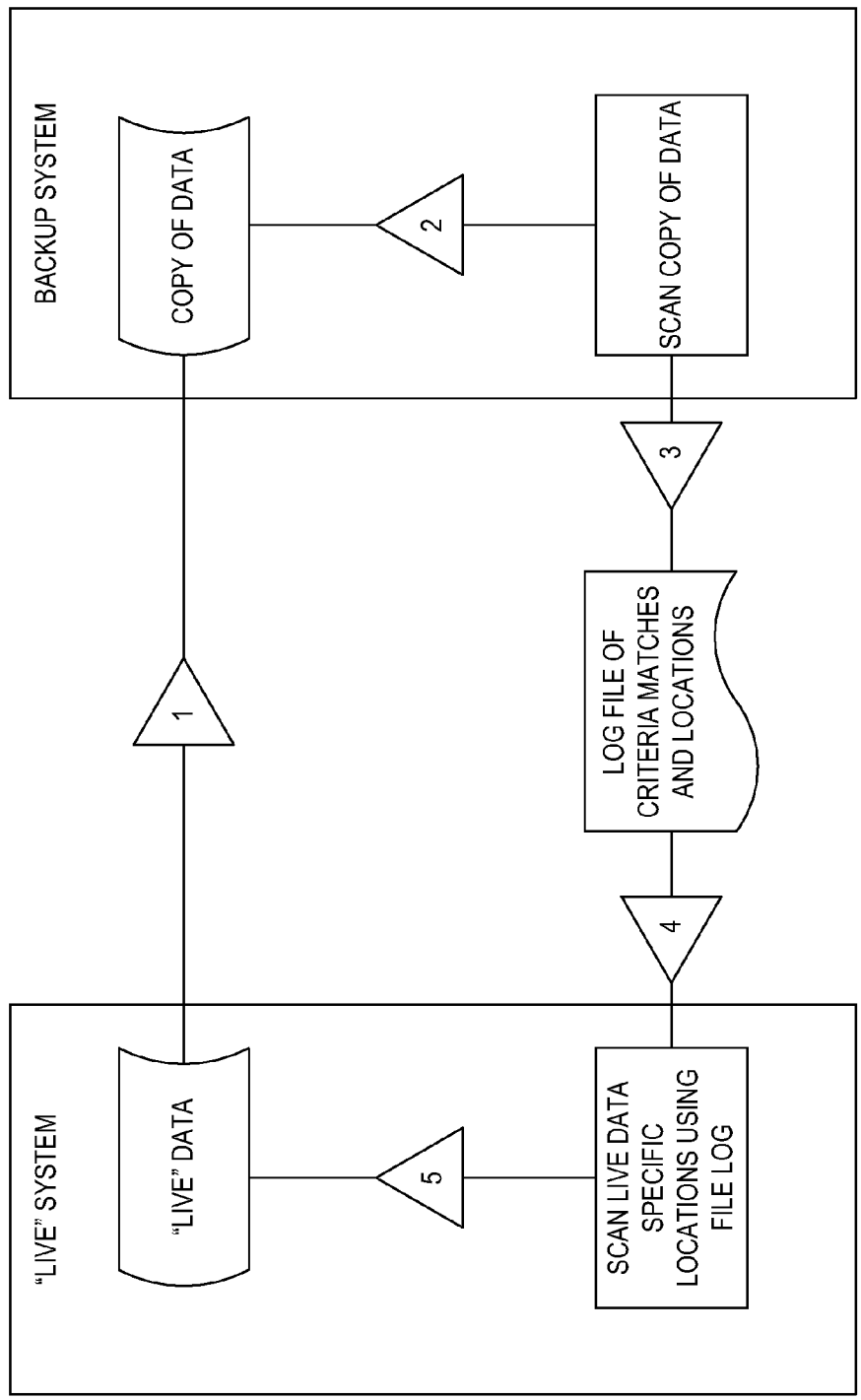
FIG. 2 is a flow diagram illustrating the main steps in the scanning of data stored on a computer.

FIG. 2 is a flow diagram illustrating the processing performed by the server 4 and the backup computer 6 in accordance with one example of the invention. In FIG. 2, a copy of the live data on a "live" system, such as the server 4 is sent (1) to a backup system such as the backup computer 6. The backup system then scans (2) the copied data for predetermined characteristics which indicate a specific content, such as a virus or a worm. The backup system creates a log file and writes (3) details of such data to the log file. It then sends (4) the log file back to the live system. The live system then scans any live data that is indicated in the log file. This takes much less time on the live computer than would a complete scan of the live data on the live computer.

The files copied from the source computer may be a complete set of files stored on the computer or it may be a fraction of the files stored. It may, for example, be the files stored on one of the volumes of the storage device 18.

Figure 3A:
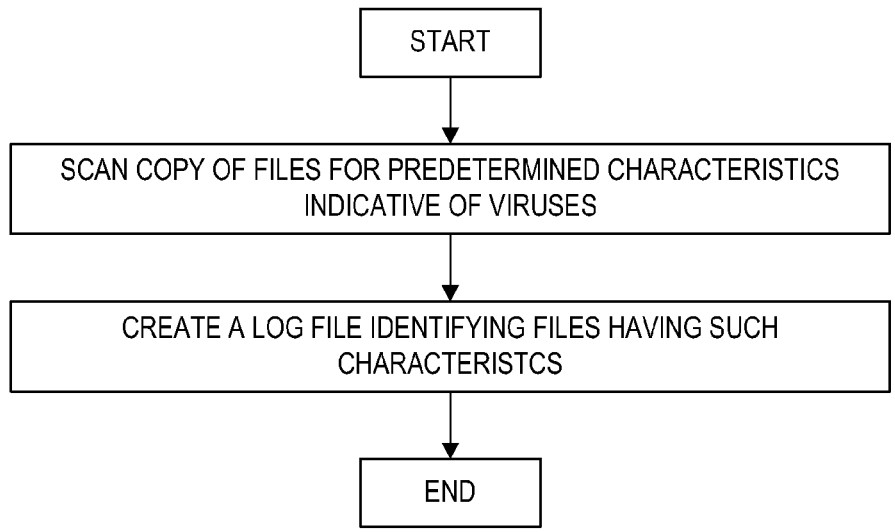
FIG. 3a is a flow diagram illustrating the processing of a computer scanning a copy of the data and producing a log file.

FIG. 3a is a flow diagram illustrating the processing performed by a scanning computer when scanning a set of files, which have been downloaded or otherwise transferred from a source computer, for predetermined characteristics indicative of specific content such as viruses. The scanning computer may be a backup computer such as the backup computer 6 illustrated in FIG. 1. This computer scans the files copied from the source computer and produces a log file identifying any files having the predetermined characteristics. Although in this embodiment the data that is scanned is in the form of files, it may take other forms such as e-mail messages or attachments within a database. The use of a backup computer to perform the scan is particularly advantageous as the files are already copied across in order to perform the backup, thus, the only additional steps are the scanning and the copying back of a single log file.

Figure 3B:
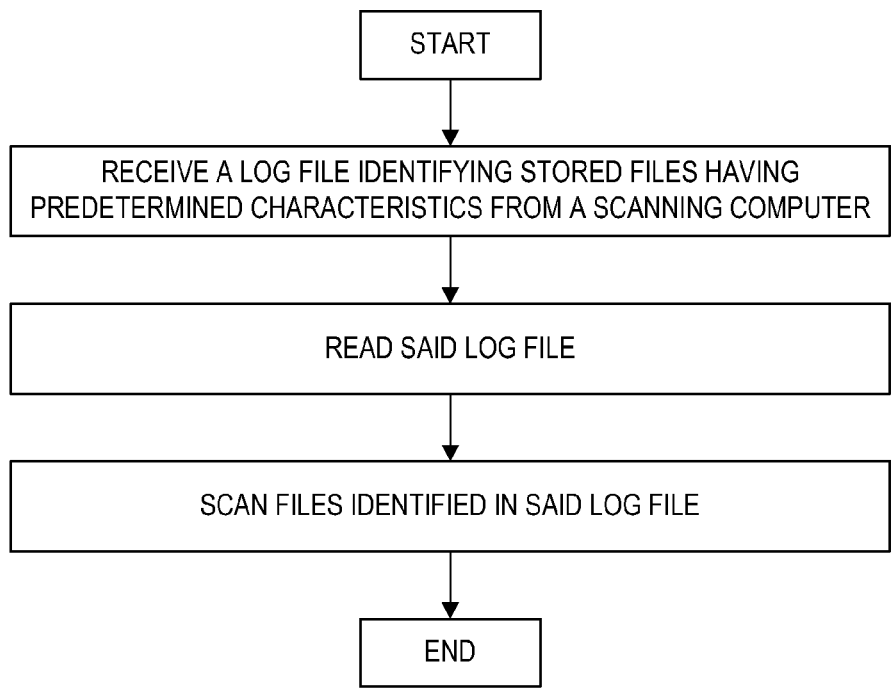
FIG. 3b is a flow diagram illustrating the processing of a computer scanning the live data on receipt of a log file.

FIG. 3b illustrates the processing of this log file after it has been sent back to the source computer from which a copy of the original files was sent. The source computer reads the log file and then scans the files identified in this log file as potentially containing viruses or banned files. This means that instead of having to scan all the files stored on the original computer, only files indicated in the log file need to be scanned. This considerably reduces the processing time required on the original computer to complete an on-demand scan.

Figure 4:
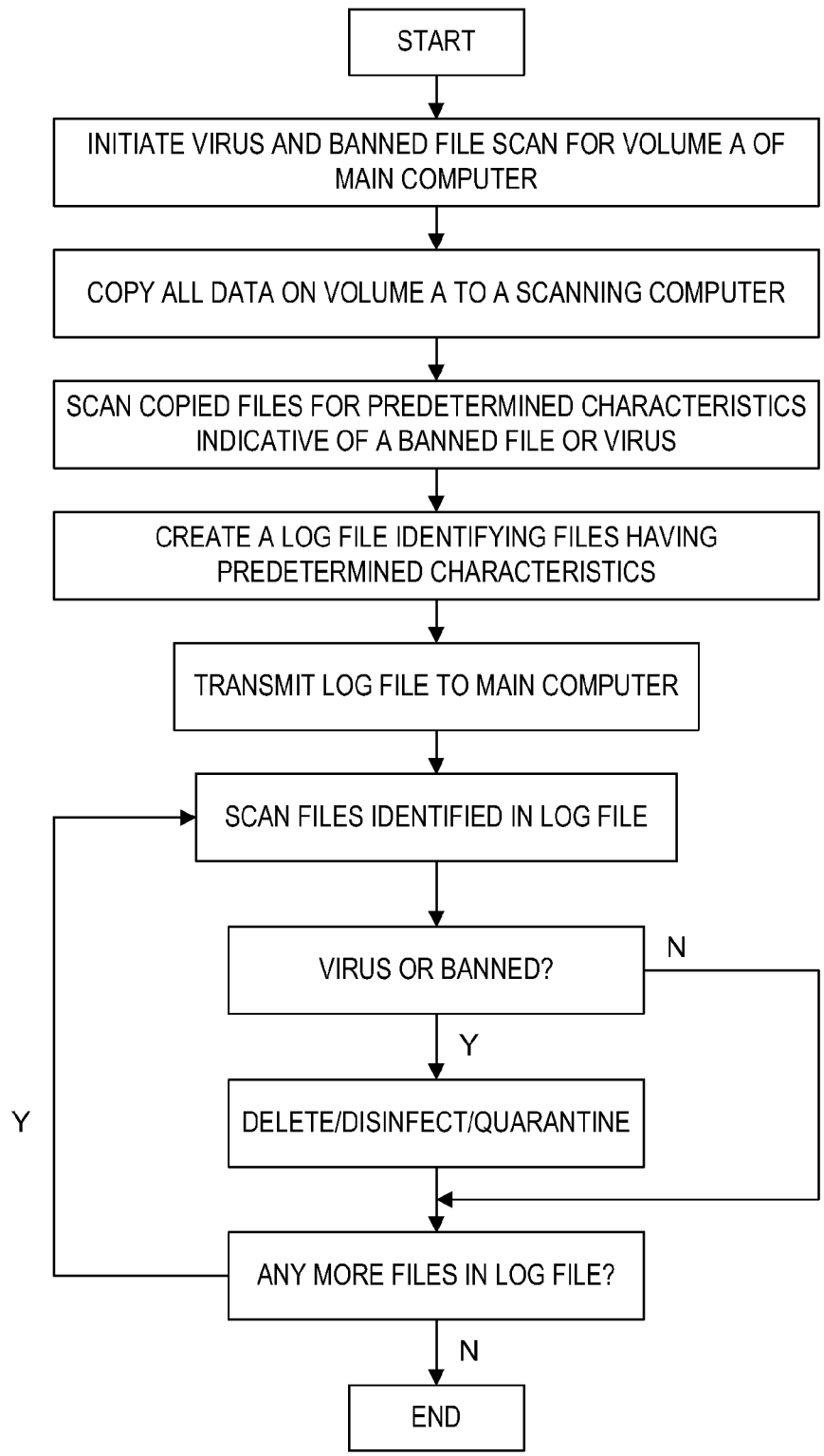
FIG. 4 is a flow diagram showing the scanning of a copy of the data from one computer on a scanning computer.

FIG. 4 illustrates an embodiment of the invention in which an on-demand scan for viruses and banned files is performed on a particular volume of a main computer. Following initiation of the scan, by for example, a user request, all of the files from volume A of the main computer are copied to a scanning computer. The scanning computer then scans the copied files for predetermined characteristics indicative of a banned file or a virus. Any files detected containing such characteristics are identified and details of these files are written to a log file. When all the copied files have been scanned the log file is sent back to the main computer. The main computer then needs only to scan the files identified in the log file, a considerably shorter process than scanning every file on the volume would be. The files having characteristics indicative of viruses or banned files are scanned and depending on the nature of any virus detected, they are either disinfected, deleted or quarantined.

In the above embodiment all of the files stored on volume A are sent to a single computer to be scanned. It is possible, however, to divide the files into different sets, and send each set to a different computer. In such an embodiment a plurality of computers can be used to perform the on-demand scan of the files, thereby decreasing the time required for each scan. Each computer then transmits its own log file back to the main computer. The main computer (such as a server 4 of FIG. 1) then reads each of the log files and scans the computer files identified in these log files.

In the above embodiments the scanning of files is generally done to detect such things as viruses and worms. However, embodiments of the above invention can be used to detect any content of a file that the user specifies. Thus, if a system administrator wishes a particular games program to be banned from the system details of the program can be added to the library of data to be scanned for. Alternatively if a check on all e-mail is required in order to confirm, for example, that there is no pornographic material present, then a scan of the stored volume of mail for particular banned words can be made.

In a further embodiment the files being backed up are scanned in-memory and are cleaned or quarantined before they are written to the backup storage medium. A log is then created which is passed back to the original server so that any infected items in the original data stores identified in the log can be processed. In this embodiment even if the log file is not used, any data recovery from the backup medium will be clean.

Figure 5:
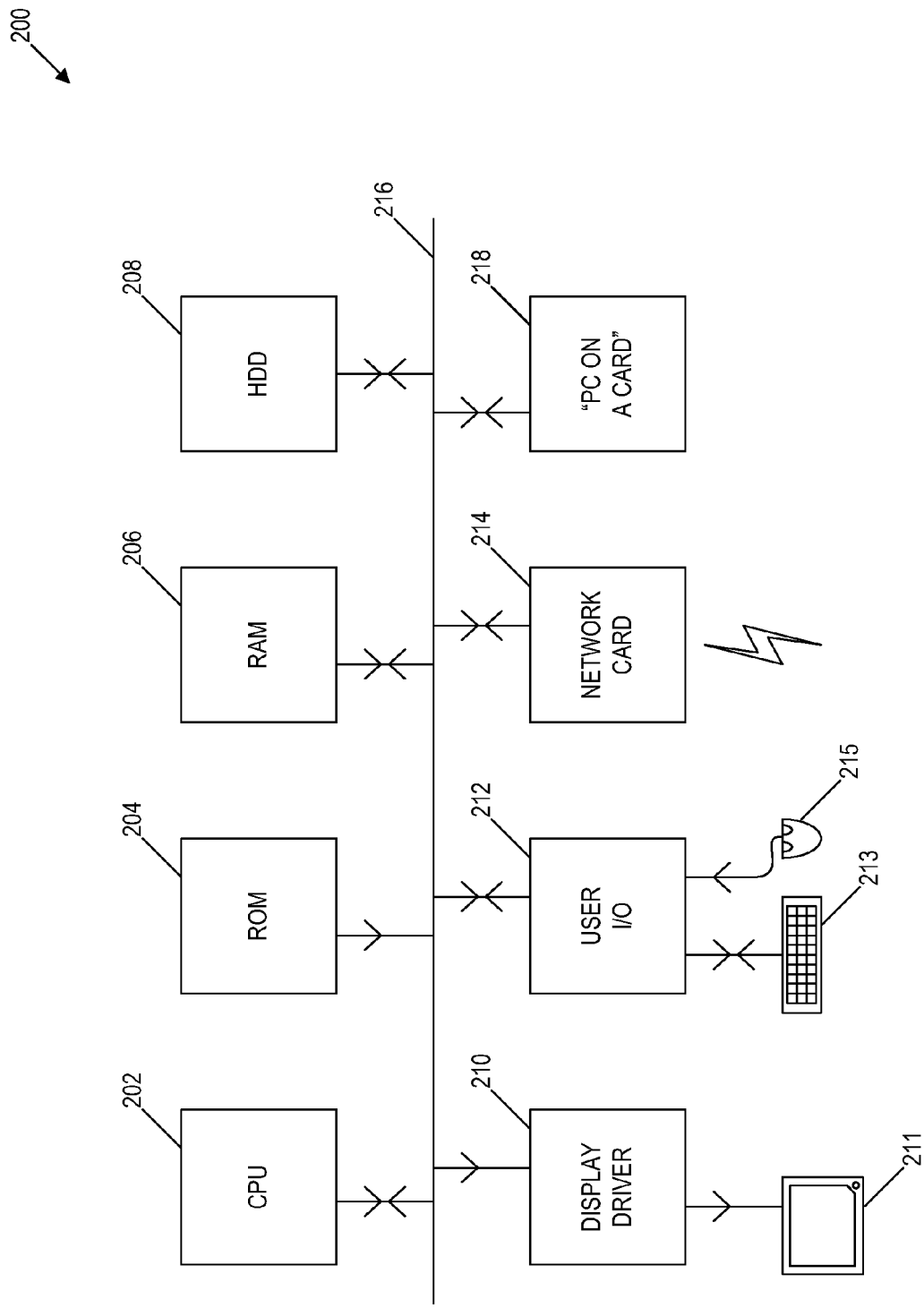
FIG. 5 schematically illustrates a general purpose computer of a type that may be used for performing scanning operations.

FIG. 5 schematically illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 5 via the system bus 216. The system bus 216 is a comparatively high bandwidth connection allowing rapid and efficient communication.

It will be appreciated that the above computer apparatus is only one example of the computer platforms that may operate in accordance with the present techniques. As examples, handheld computers and interactive televisions may be used. The display driver may also serve to provide audio output and the input devices may include pen based devices, cameras (for automated recognition) and microphones. The hard disk drive may be replaces or supplemented with a floppy disk drive, a CD/DVD drive or memory cards. It will be understood that these are only some examples of the variation in computer platform that may be used as appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product, comprising:
   scanning logic operable to scan computer data transferred from source computer to a scanning computer and to identify one or more portions of said computer data having one or more predetermined characteristics indicative of said computer data having specified content;
   log generating logic operable to write details of said identified portions to a log file, wherein said computer program product comprises log transferring logic operable to control said scanning computer to transfer said log file to said source computer from where said computer data is received;
   wherein said computer program product is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
   wherein said computer program product is operable such that said copy of said computer data scanned at said scanning computer is scanned and cleaned in-memory prior to being written to a computer storage medium of said scanning computer;
   wherein said computer data includes data stored on a single volume of a storage device of said source computer;
   wherein said computer program product is operable such that said data stored on said single volume of said storage device of said source computer is divided into a plurality of subsets, each subset transferred to a different one of a plurality of scanning computers, whereby each scanning computer performs the following:
      identifying a one or more portions of one of said subsets received by said scanning computer having one or more predetermined characteristics indicative of said subset having said specified content;
      writing said details of said identified portions to said log file, said details including an indication of each of said identified portions and a location of each of said identified portions; and
      transferring said log file to said source computer;
   wherein said source computer receives a plurality of log files for said data stored on said single volume of said storage device of said source computer, one log file received from each of said plurality of scanning computers;
   wherein said source computer reads each of said plurality of boa files and scans only said identified portions indicated in each of said plurality of log files.

2. A computer program product according to claim 1, wherein said predetermined characteristics are characteristics indicative of said computer data comprising one or more of:
   a computer virus;
   a worm;
   a Trojan; and
   a computer file comprising banned content.

3. A computer program product according to claim 2, wherein said scanning logic is operable to scan computer data located in executable computer files.

4. A computer program product according to claim 1, wherein said specified contents includes banned words or phrases and said computer program is part of an e-mail or data filtering system.

5. A computer program product according to claim 1, wherein said scanning and said cleaning of said copy of said computer data in-memory includes scanning and cleaning said copy of said computer data in a random access memory of said scanning computer.

6. A computer program product according to claim 1, wherein said computer storage medium of said scanning computer includes a backup storage medium of said scanning computer.

7. A computer program product according to claim 1, wherein said cleaning of said copy of said computer data in-memory includes disinfecting a virus.

8. A computer program product comprising:
scanning logic operable to scan computer data transferred from a source computer to a scanning computer and to identify one or more portions of said computer data having one or more predetermined characteristics indicative of said computer data having specified content; and
log generating logic operable to write details of said identified portions to a log file, wherein said scanning computer is a backup computer for performing a backup procedure upon said computer data of said source computer, said computer program product being operable to control said backup computer to scan said computer data transferred to said backup computer from said source computer during said backup procedure;
wherein said computer program product is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said computer program product is operable such that said log file is transferred to said source computer from where said computer data is received;
wherein said computer program product is operable such that said copy of said computer data scanned at said scanning computer is scanned and cleaned in-memory prior to being written to a computer storage medium of said scanning computer;
wherein said computer data includes data stored on a single volume of a storage device of said source computer;
wherein said computer program product is operable such that said data stored on said single volume of said storage device of said source computer is divided into a plurality of subsets, each subset transferred to a different one of a plurality of scanning computers, whereby each scanning computer performs the following:
identifying one or more portions of one of said subsets received by said scanning computer having one or more predetermined characteristics indicative of said subset having said specified content;
writing said details of said identified portions to said log file, said details including an indication of each of said identified portions and a location of each of said identified portions; and
transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

9. A computer program product comprising:
log reading logic operable to control a source computer to read a log file written by a scanning computer, said log file identifying portions of computer data having predetermined characteristics; and
response logic responsive to said log file operable to control said source computer to perform further processing tasks upon at least said data identified in said log file as having said predetermined characteristics;
wherein said computer program product is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said computer program product is operable such that said log file is transferred to said source computer from where said computer data is received;
wherein said computer program product is operable such that said copy of said computer data scanned at said scanning computer is scanned and cleaned in-memory prior to being written to a computer storage medium of said scanning computer;
wherein said computer data includes data stored on a single volume of a storage device of said source computer;
wherein said computer program product is operable such that said data stored on said single volume of said storage device of said source computer is divided into a plurality of subsets, each subset transferred to a different one of a plurality of scanning computers, whereby each scanning computer performs the following:
identifying one or more portions of one of said subsets received by said scanning computer having one or more predetermined characteristics indicative of said subset having said specified content;
writing details of said identified portions to said log file, said details including an indication of each of said identified portions and a location of each of said identified portions; and
transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

10. A computer program product according to claim 9, wherein said computer program product comprises log file receiving logic operable to control said source computer to receive said log file transmitted by said scanning computer.

11. A computer program product according to claim 10, further comprising transmission logic operable to control said source computer to transmit said computer data to be scanned to said scanning computer.

12. A computer program product according to claim 9, wherein said predetermined characteristics are characteristics indicative of said computer data comprising one or more of:
a computer virus;
a worm;
a Trojan; and
a computer file comprising banned content.

13. A computer program product according to claim 12, wherein said computer program product comprises anti-virus logic operable to control said source computer to perform a virus response action upon data identified.

14. A computer program product according to claim 9, wherein said specified content includes banned words and said computer program is part of an e-mail filtering system.

15. A computer program product according to claim 9, wherein said specified content includes banned words or phrases and said computer program is part of a file storage filtering system.

16. A method comprising:
using a scanning computer to scan computer data transferred from a source computer to identify one or more portions of said computer data having one or more predetermined characteristics indicative of said computer data having said specified content;
writing to a log file information identifying said portions; and
transferring said log file to said source computer from where said computer data is received;
wherein an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said copy of said computer data scanned at said scanning computer is scanned and cleaned in-memory prior to being written to a computer storage medium of said scanning computer;
wherein said computer data includes data stored on a single volume of a storage device of said source computer;
wherein said data stored on said single volume of said storage device of said source computer is divided into a plurality of subsets, each subset transferred to a different one of a plurality of scanning computers, whereby each scanning computer performs the following:
identifying one or more portions of one of said subsets received by said scanning computer having one or more predetermined characteristics indicative of said subset having said specified content;
writing details of said identified portions to said log file, said details including an indication of each of said identified portions and a location of each of said identified portions; and
transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

17. A method according to claim 16, wherein said predetermined characteristics are characteristics indicative of said computer data comprising one or more of:
a computer virus;
a worm;
a Trojan; and
a computer file comprising banned content.

18. A method according to claim 16, wherein said specified content includes banned words and said method is a method for filtering e-mail.

19. A method according to claim 16, wherein:
at a first point in time, said source computer transfers said computer data to said scanning computer;
at a second point in time after the first point in time, said scanning computer scans said computer data and writes to said log file information identifying said portions;
at a third point in time after the second point in time, said scanning computer transfers said log file to said source computer from where said computer data is received.

20. A method comprising:
using a scanning computer to scan computer data transferred from a source computer to identify one or more portions of said computer data having one or more predetermined characteristics indicative of said computer data having said specified content;
writing to a log file information identifying said portions, wherein said scanning computer comprises a backup computer for performing a backup procedure upon said computer data of said source computer, said method further comprising the initial step of transferring said computer data from said source computer to said backup computer during said backup procedure;
wherein an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said log file is transferred to said source computer from where said computer data is received;
wherein said copy of said computer data scanned at said scanning computer is scanned and cleaned in-memory prior to being written to a computer storage medium of said scanning computer;
wherein said computer data includes data stored on a single volume of a storage device of said source computer;
wherein said data stored on said single volume of said storage device of said source computer is divided into a plurality of subsets, each subset transferred to a different one of a plurality of scanning computers, whereby each scanning computer performs the following:
identifying one or more portions of one of said subsets received by said scanning computer having one or more predetermined characteristics indicative of said subset having said specified content;
writing details of said identified portions to said log file, said details including an indication of each of said identified portions and a location of each of said identified portions; and
transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

21. A method according to claim 20, wherein said backup procedure occurs via a network between said source computer and said backup computer.

22. A method comprising:
using a source computer to read a log file written by a scanning computer, said log file identifying data stored on said source computer having predetermined characteristics indicative of specified content; and
in response to said log file, controlling said source computer to perform further processing tasks upon at least said data identified in said log file as having said predetermined characteristics;
wherein an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;

wherein said log file is transferred to said source computer from where said computer data is received;

wherein said copy of said computer data scanned at said scanning computer is scanned and cleaned in-memory prior to being written to a computer storage medium of said scanning computer;

wherein said computer data includes data stored on a single volume of a storage device of said source computer;

wherein said data stored on said single volume of said storage device of said source computer is divided into a plurality of subsets, each subset transferred to a different one of a plurality of scanning computers, whereby each scanning computer performs the following:

identifying one or more portions of one of said subsets received by said scanning computer having one or more predetermined characteristics indicative of said subset having said specified content;

writing details of said identified portions to said log file, said details including an indication of each of said identified portions and a location of each of said identified portions; and transferring said log file to said source computer;

wherein said source computer receives a plurality of log files for said data stored on said single volume of said storage device of said source computer, one log file received from each of said plurality of scanning computers;

wherein said source computer reads each of said plurality of log files and scans only said identified portions indicated in each of said plurality of log files.

23. A method according to claim 22, said method further comprising prior to step (i) the step of receiving said log file transmitted by said scanning computer.

24. A method according to claim 23, further comprising an initial step of transmitting said computer data to be scanned from said source computer to said scanning computer.

25. A method according to claim 22, wherein said predetermined characteristics are characteristics indicative of said computer data comprising one or more of:
    a computer virus;
    a worm;
    a Trojan; and
    a computer file comprising banned content.

26. A method according to claim 25, wherein said computer program product comprises anti-virus logic operable to control said source computer to perform a virus response action upon data identified.

27. A method according to claim 22, wherein said specified content includes banned words and said method is part of an e-mail filtering method.

28. A method comprising:
    copying computer data from a source computer to a scanning computer;
    scanning said copied computer data with said scanning computer to identify one or more portions of said computer data having one or more predetermined characteristics indicative of said computer data having at least some specified content;
    writing to a log file information identifying said portions;
    transferring said log file to said source computer from where said computer data is received; and
    controlling said source computer in response to said log file to perform further processing tasks upon at least said data identified in said log file as having said predetermined characteristics;

wherein an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;

wherein said copy of said computer data scanned at said scanning computer is scanned and cleaned in-memory prior to being written to a computer storage medium of said scanning computers wherein said computer data includes data stored on a single volume of a storage device of said source computer;

wherein said data stored on said single volume of said storage device of said source computer is divided into a plurality of subsets, each subset transferred to a different one of a plurality of scanning computers, whereby each scanning computer performs the following:

identifying one or more portions of one of said subsets received by said scanning computer having one or more predetermined characteristics indicative of said subset having said specified content;

writing details of said identified portions to said log file, said details including an indication of each of said identified portions and a location of each of said identified portions; and transferring said log file to said source computer;

wherein said source computer receives a plurality of log files for said data stored on said single volume of said storage device of said source computer, one log file received from each of said plurality of scanning computers;

wherein said source computer reads each of said plurality of log files and scans only said identified portions indicated in each of said plurality of log files.

29. A system comprising:
a scanning device operable to scan computer data transferred from a source computer to a scanning computer and to identify one or more portions of said computer data having one or more predetermined characteristics indicative of said computer data having said specified content;

a log generating device operable to write details of said identified portions to a log file, and a log transferring device operable to transfer said log file from said scanning computer to said source computer from where said computer data is received;

wherein said system is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;

wherein said system is operable such that said copy of said computer data scanned at said scanning computer is scanned and cleaned in-memory prior to being written to a computer storage medium of said scanning computer;

wherein said computer data includes data stored on a single volume of a storage device of said source computer;

wherein said system is operable such that said data stored on said single volume of said storage device of said source computer is divided into a plurality of subsets, each subset transferred to a different one of a plurality of scanning computers, whereby each scanning computer performs the following:
  identifying one or more portions of one of said subsets received by said scanning computer having one or more predetermined characteristics indicative of said subset having said specified content;
  writing said details of said identified portions to said log file, said details including an indication of each of said identified portions and a location of each of said identified portions; and
  transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

30. A system according to claim 29, wherein said predetermined characteristics are characteristics indicative of said computer data comprising one or more of:
  a computer virus;
  a worm;
  a Trojan; and
  a computer file comprising banned content.

31. A system according to claim 30, wherein said scanning device is operable to scan computer data located in executable computer files.

32. A system according to claim 29, wherein said specified content includes banned words and said scanning computer is part of an e-mail filtering system.

33. A system comprising:
  a scanning device operable to scan computer data transferred from a source computer to a scanning computer and to identify one or more portions of said computer data having one or more predetermined characteristics indicative of said computer data having specified content; and
  a log generating device operable to write details of said identified portions to a log file, wherein said scanning computer comprises a backup computer for performing a backup procedure upon said computer data of said source computer, said scanning device being operable to scan data transferred to said backup computer from said source computer during said backup procedure;
wherein said system is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said system is operable such that said log file is transferred to said source computer from where said computer data is received;
wherein said system is operable such that said copy of said computer data scanned at said scanning computer is scanned and cleaned in-memory prior to being written to a computer storage medium of said scanning computer;
wherein said computer data includes data stored on a single volume of a storage device of said source computer;
wherein said system is operable such that said data stored on said single volume of said storage device of said source computer is divided into a plurality of subsets, each subset transferred to a different one of a plurality of scanning computers, whereby each scanning computer performs the following:
  identifying one or more portions of one of said subsets received by said scanning computer having one or more predetermined characteristics indicative of said subset having said specified content;
  writing said details of said identified portions to said log file, said details including an indication of each of said identified portions and a location of each of said identified portions; and
  transferring said log file to said source computer;
wherein said source computer receives a plurality of log files for said data stored on said single volume of said storage device of said source computer, one log file received from each of said plurality of scanning computers;
wherein said source computer reads each of said plurality of log files and scans only said identified portions indicated in each of said plurality of log files.

34. An apparatus comprising:
  a log file reading device operable to read a log file written by a scanning computer, said log file identifying data stored on a source computer having predetermined characteristics; and
  a controller responsive to said log file and operable to control said source computer to perform further processing tasks upon at least said data identified in said log file as having said predetermined characteristics;
wherein said apparatus is operable such that an amount of scanning of said computer data at said source computer is reduced by: 1) scanning a copy of said computer data at said scanning computer, and 2) scanning at said source computer only said computer data indicated in said log file as having said one or more predetermined characteristics indicative of said computer data having said specified content;
wherein said apparatus is operable such that said log file is transferred to said source computer from where said computer data is received;
wherein said apparatus is operable such that said copy of said computer data scanned at said scanning computer is scanned and cleaned in-memory prior to being written to a computer storage medium of said scanning computer;
wherein said computer data includes data stored on a single volume of a storage device of said source computer;
wherein said apparatus is operable such that said data stored on said single volume of said storage device of said source computer is divided into a plurality of subsets, each subset transferred to a different one of a plurality of scanning computers, whereby each scanning computer performs the following:
  identifying one or more portions of one of said subsets received by said scanning computer having one or more predetermined characteristics indicative of said subset having said specified content;
  writing details of said identified portions to said log file, said details including an indication of each of said identified portions and a location of each of said identified portions; and
  transferring said log file to said source computer;
wherein said source computer receives a plurality of log files for said data stored on said single volume of said storage device of said source computer, one log file received from each of said plurality of scanning computers;

wherein said source computer reads each of said plurality of log files and scans only said identified portions indicated in each of said plurality of log files.

35. An apparatus according to claim 34, said apparatus further comprising a log receiving device operable to receive said log file transmitted by said scanning computer.

36. An apparatus according to claim 35, said apparatus further comprising a transmitting device operable to transmit said computer data to be scanned from said source computer to said scanning computer.

37. An apparatus according to claim 34, wherein said predetermined characteristic is a characteristic indicative of said computer data comprising one or more of:
   a computer virus;
   a worm;
   a Trojan; and
   a computer file comprising banned content.

38. An apparatus according to claim 37, wherein said controller is operable to control said source computer to perform a virus response action upon data identified.

39. An apparatus according to claim 34, wherein said specified content includes banned words and said apparatus is part of an e-mail filtering system.

40. A method of business for a backup provider comprising in addition to providing a backup of a set of files from a source computer, providing a file scan service, such that said set of files is scanned to detect files having a predetermined characteristic indicative of at least some specified content and producing a log file identifying said detected files;
   wherein an amount of scanning of said files at said source computer is reduced by: 1) scanning a copy of said files at a scanning computer, and 2) scanning at said source computer only said files indicated in said log file as having said one or more predetermined characteristics indicative of said files having said specified content;
   wherein said log file is transferred to said source computer from where said set of files is received;
   wherein said copy of said files scanned at said scanning computer is scanned and cleaned in-memory prior to being written to a computer storage medium of said scanning computer;
   wherein said files includes data stored on a single volume of a storage device of said source computer;
   wherein said data stored on said single volume of said storage device of said source computer is divided into a plurality of subsets, each subset transferred to a different one of a plurality of scanning computers, whereby each scanning computer performs the following:
      identifying one or more portions of one of said subsets received by said scanning computer having one or more predetermined characteristics indicative of said subset having said specified content;
      writing details of said identified portions to said log file, said details including an indication of each of said identified portions and a location of each of said identified portions; and
      transferring said log file to said source computer;
   wherein said source computer receives a plurality of log files for said data stored on said single volume of said storage device of said source computer, one log file received from each of said plurality of scanning computers;
   wherein said source computer reads each of said plurality of log files and scans only said identified portions indicated in each of said plurality of log files.

* * * * *

UNITED STATES PATENT AND TRADEMARK OFFICE
CERTIFICATE OF CORRECTION

PATENT NO. : 7,644,352 B2  
APPLICATION NO. : 09/879071  
DATED : January 5, 2010  
INVENTOR(S) : Robert Grupe Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-first Day of December, 2010

David J. Kappos  
*Director of the United States Patent and Trademark Office*